W. H. KEMPTON.
INSULATING SUPPORT FOR OVERHEAD ELECTRIC RAILWAY CONDUCTORS.
APPLICATION FILED JULY 23, 1909.
966,102.
Patented Aug. 2, 1910.
2 SHEETS—SHEET 2.
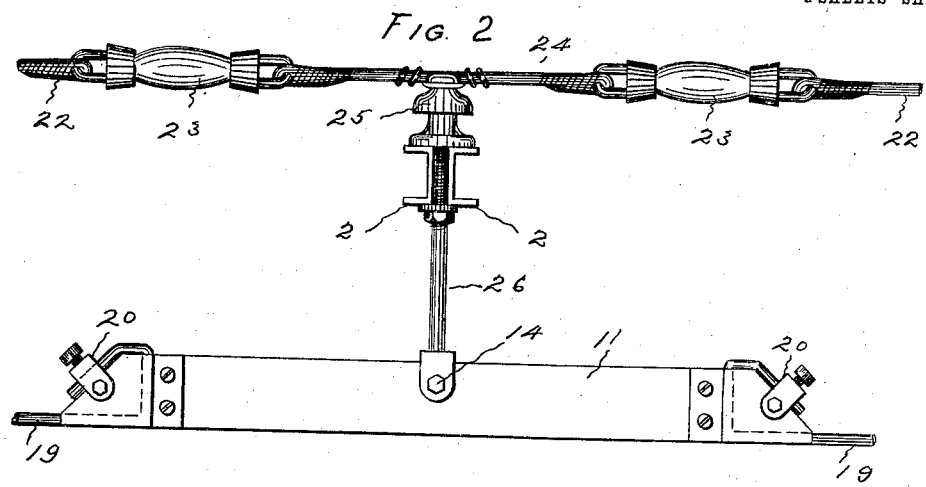
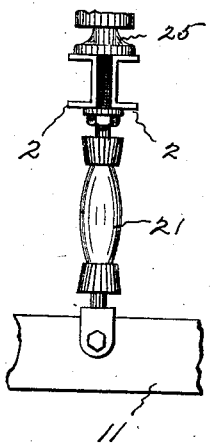
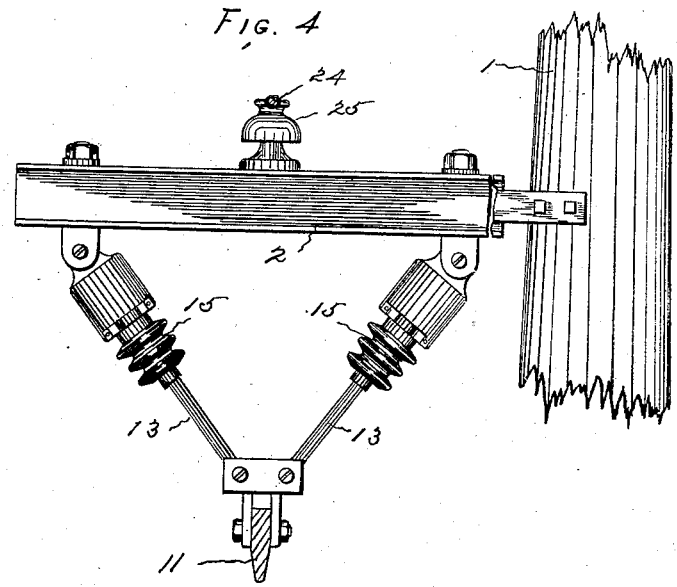
WITNESSES:
Howard L. Holcomb
Josephine M. Strempfer.
INVENTOR
Willard H. Kempton
by Harry P. Williams
atty.

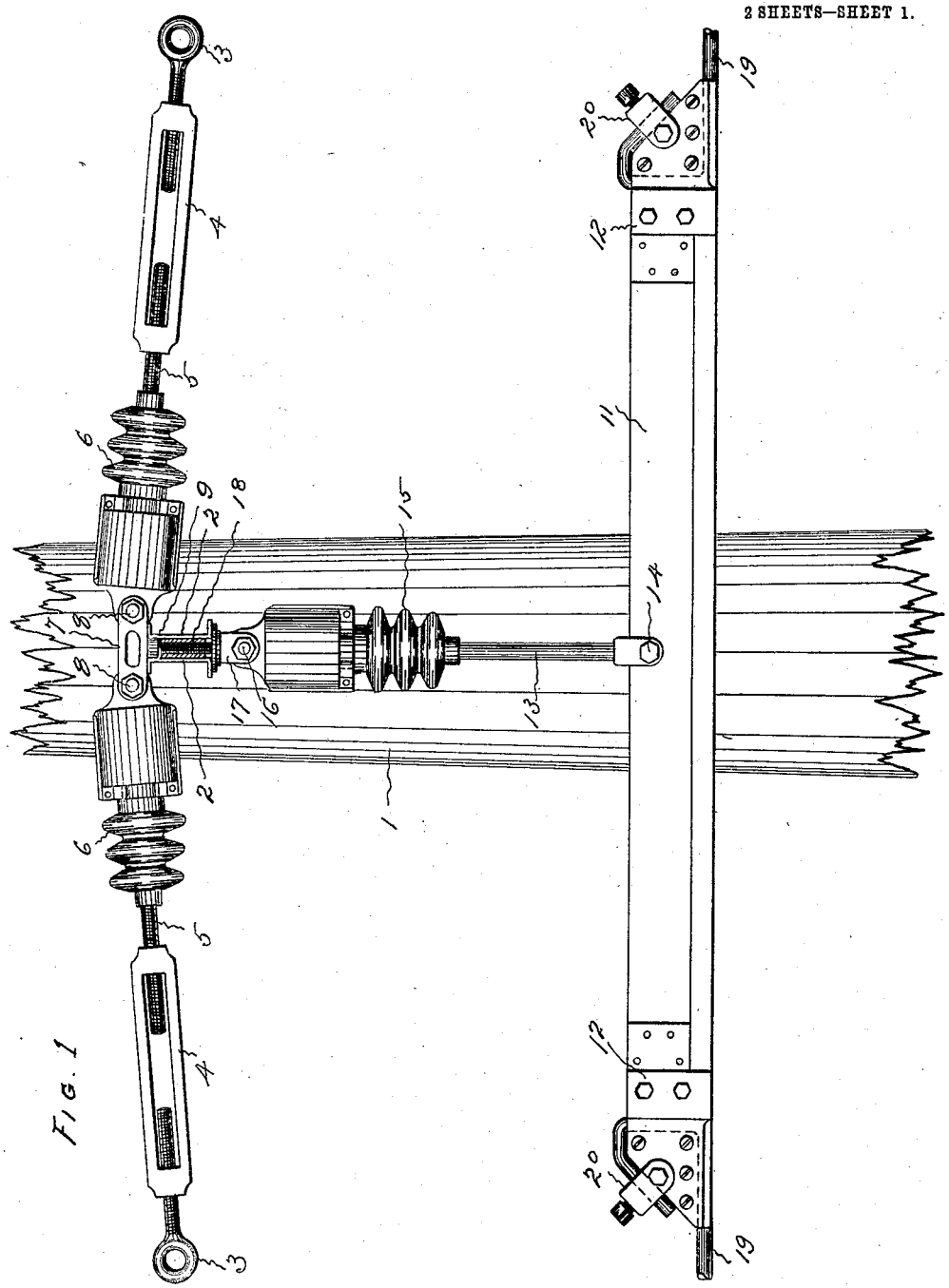

UNITED STATES PATENT OFFICE.

WILLARD H. KEMPTON, OF HARTFORD, CONNECTICUT, ASSIGNOR TO THE JOHNS-PRATT COMPANY, OF HARTFORD, CONNECTICUT, A CORPORATION OF CONNECTICUT.

INSULATING-SUPPORT FOR OVERHEAD ELECTRIC-RAILWAY CONDUCTORS.

966,102.            Specification of Letters Patent.        Patented Aug. 2, 1910.

Application filed July 23, 1909. Serial No. 509,175.

*To all whom it may concern:*

Be it known that I, WILLARD H. KEMPTON, a citizen of the United States, residing at Hartford, in the county of Hartford and State of Connecticut, have invented a new and useful Improvement in Insulating-Supports for Overhead Electric-Railway Conductors, of which the following is a specification.

This invention relates to a structure which is particularly useful for supporting insulated sections of trolley wires of catenary over-head electric railway systems.

In a catenary system, to which the present invention more particularly relates, although it may be used with other types of overhead systems, the service conductor is suspended in position above the track by means of a messenger wire or cable, which cable is supported from bracket arms that project from poles, or span wires or bridge beams that extend between poles or towers erected adjacent to the track at suitable intervals.

The object of the invention is to provide a simple, durable and efficient structure that may be used for supporting, joining and insulating the ends of sections of a conductor carrying the same voltage, or different voltages, or a section charged with alternating current and a section charged with direct current, without interfering with the smooth running of a trolley thereunder.

The invention is illustrated in the accompanying drawings as designed to be used in connection with a single pole system. Such a system has a single line of poles on one side of the track and each pole has a bracket arm projecting over the track.

In the views, Figure 1 shows a front elevation of a portion of a trolley pole and bracket with the separated and insulated ends of two sections of a conductor supported thereby and insulated therefrom by a structure which embodies this invention. Fig. 2 shows a front elevation with the separated and insulated ends of two sections of a conductor, and the ends of two sections of a messenger or supporting cable, connected with a supporting bracket by a modified form of structure which embodies this invention. Fig. 3 shows a form of insulator that may be used between the bracket and the center of the section insulator for supporting the section insulator. Fig. 4 shows a side elevation of a section insulator support, which is arranged to prevent swaying of the section insulator.

The pole 1, is illustrated as made of wood, and the bracket arms shown are constructed of a pair of channel-beams 2 fastened together a slight distance apart.

In the structure shown in Fig. 1, the end of each section of the messenger cable is designed to be fastened to the eye 3 of the turn buckle 4. The stem 5 of each turn buckle is connected with a high tension strain insulator 6, of common form. The ends of these insulators may be fastened to a link 7 by bolts 8. This link may have a stem 9 and can be secured on the top of the bracket arm by passing the stem between the beams. By this means, the sections of the messenger cable are efficiently insulated and securely supported.

A section insulator, preferably formed of a wooden bar 11 provided with metallic end pieces 12, is supported by a rod 13 which is attached to the middle of the bar by a bolt 14. This rod may be fastened to a high tension strain insulator 15 of common form. This insulator may be connected by a bolt 16 with the head 17 which has a stem 18 that is screwed into or otherwise attached to the stem of the link 7. The metallic end pieces of the section insulator are grooved to receive the ends 19 of the sections of the conductor, and are provided with clamps 20 for securing the conductor ends. By this means the ends of the conductor sections are securely fastened together in such manner that there is no interference with the free running thereunder of the trolley, and they are efficiently insulated from each other, and also from the supporting bracket.

The structure described is particularly serviceable for use in separating and supporting conductor sections used in a high tension railroad system. The ends of the conductor sections are efficiently insulated from each other, and the ends of the messenger cable are efficiently insulated from each other. The messenger sections and conductor sections are also efficiently insulated from each other and from the supporting bracket by strong and durable parts, which are easy to assemble and adjust, and which do not interfere with the free running of the trolley. With this structure sections of conductors having the same or different voltages, one high tension and one low tension, or one section that is connected with an alternating system, and the other that is connected with a direct current system, can be efficiently insulated and securely supported. If desired, the section insulator bar 11 may be supported by and insulated from the bracket arm 2 by means of a common form of wooden strain insulator 21, as shown in Fig. 3, instead of by the high tension insulator 15 shown in Fig. 1. If it is desired to employ a double central support, two strain insulators may be arranged as shown in Fig. 4. In this case the upper ends of these supporting insulators are spread some distance apart so as to prevent the section insulator from swaying sidewise.

In the form shown in Fig. 2, the ends 22 of the messenger cable are insulated from each other by a pair of wooden strain insulators 23, of common form. These insulators may be connected by a wire or cable 24 that rests in the top of and is secured to a line insulator 25 mounted on the top of the bracket arm. The rod 26 that is connected with the wooden bar of the section insulator may be secured to the stem of the line insulator. In this form the sections of the messenger cable are insulated from each other by the two strain insulators, and insulated from the bracket arm by the strain insulators and the line insulators, while the sections of the conductor are insulated from each other and from the bracket by the wooden bar of the section insulator. This structure is more particularly adapted for a lower tension system than is that shown in Fig. 1.

In all of the forms shown, the section insulator is supported at the middle, and, consequently, is free to oscillate vertically as the trolley passes beneath from one conductor section to the other.

The invention claimed is:

1. An overhead supporting and section insulating structure for electric railway conductors comprising a rigid support, a section insulator having at its ends means for the attachment of the ends of conductor sections, a hanger connecting the middle of the section insulator to the support, said hanger being composed of two branches which are wider apart at the support than at the section insulator, whereby the hanger supports the section insulator and holds it against sidewise swaying, but permits the ends to freely rise and fall, means for the attachment of the ends of sections of a messenger cable, and insulators interposed between said messenger-cable attaching-means and the support.

2. An overhead supporting and section insulating structure for electric railway conductors comprising a rigid support, a section insulator having at its ends means for the attachment of the ends of conductor sections, an insulated hanger connecting the middle of the section insulator to the support, said hanger being composed of two branches which are wider apart at the support than at the section insulator, whereby the hanger supports the section insulator and holds it against sidewise swaying, but permits the ends to freely rise and fall, means for the attachment of the ends of sections of a messenger cable, and insulators interposed between said messenger-cable attaching-means and the support.

3. An overhead supporting and section insulating structure for electric railway conductors, comprising a rigid support, a section insulator having at its ends means for the attachment of the ends of conductor sections, an insulated hanger connecting the middle of the section insulator to the support, said hanger being composed of two branches which are wider apart at the support than at the section insulator, whereby the hanger supports the section insulator and holds it against sidewise swaying, but permits its ends to freely rise and fall, and means for the attachment of the ends of sections of a messenger cable, connected with the support.

WILLARD H. KEMPTON.

Witnesses:
   JOSEPHINE M. STREMPFER,
   H. R. WILLIAMS.